United States Patent [19]

Gardiner

[11] Patent Number: 4,641,862
[45] Date of Patent: Feb. 10, 1987

[54] ROTATIONALLY MOLDED NOZZLE LINER AND METHOD FOR ITS INSTALLATION

[76] Inventor: Randy A. Gardiner, 8255 Fruitvale Ave., Moorpark, Calif. 93021

[21] Appl. No.: 715,888

[22] Filed: Mar. 25, 1985

[51] Int. Cl.⁴ .......................................... F16L 58/10
[52] U.S. Cl. .................... 285/39; 29/157 R; 29/512; 285/55; 285/222; 285/291; 285/214; 264/126
[58] Field of Search .............. 285/222, 291, DIG. 10, 285/214, 55, 39; 29/157 R, 512; 264/126

[56] References Cited

U.S. PATENT DOCUMENTS

| 2,266,610 | 12/1941 | Martin | 285/55 |
| 2,453,331 | 11/1948 | Martin | 285/55 |
| 2,907,103 | 10/1959 | Lewis et al. | 285/DIG. 10 |
| 3,030,253 | 4/1962 | St. John et al. | 285/DIG. 10 |
| 3,383,750 | 5/1968 | Schroeder et al. | 29/157 R |
| 3,390,442 | 7/1968 | Sosnowski | 29/157 R |
| 3,744,951 | 7/1973 | Szatkowski | 264/126 |
| 3,970,736 | 7/1976 | Gimaret | 264/126 |
| 3,984,132 | 10/1976 | Sarson | 285/222 |
| 4,520,547 | 6/1985 | Laursen et al. | 285/55 |

FOREIGN PATENT DOCUMENTS 3048191  7/1982  Fed. Rep. of Germany ........ 285/55
7504600 10/1976  Netherlands ........................ 285/55
 322834 12/1929  United Kingdom .................. 285/55

Primary Examiner—Cornelius J. Husar
Assistant Examiner—Eric K. Nicholson
Attorney, Agent, or Firm—Plante, Strauss & Vanderburgh

[57] ABSTRACT

There is disclosed a nozzle liner and a method for its installation for the protection of nozzles of vessels. The nozzle liner comprises a sleeve fitting the internal diameter of the nozzle and having an integral end flange. The nozzle liner is inserted into the nozzle with its integral end flange bearing against the outer face of the ring flange of the nozzle. The nozzle liner is rotationally molded with an end flange and is free of internal stresses and seams. The preferred method of its installation simultaneously flares and bonds the nozzle liner to the lining of the vessel in a fashion which confines the stressed portions of the nozzle liner in the annular lamination area. In this position, the end of the nozzle liner projects inside the vessel and the projecting end is thermoformed to flare it outwardly and form an annular seal laminated against the inner corrosion liner of the vessel. For this purpose a heated flaring and laminating tool is employed.

15 Claims, 5 Drawing Figures

ROTATIONALLY MOLDED NOZZLE LINER AND METHOD FOR ITS INSTALLATION

BACKGROUND OF THE INVENTION

1. Field Of The Invention

This invention relates to a nozzle liner and a method for installing the liner in a nozzle of a vessel, and in particular, to a nozzle and method of installation which avoids the potential for failure of prior nozzle liners.

2. Brief Statement Of The Prior Art

Process and storage vessels have commonly been protected against corrosion by lining the vessels with layers of plastic sheets. Commonly thermoplastic sheets are bonded against the inside walls of the vessel. The adjacent sheets are butted and welded in continuous seams to provide integrity of the liner.

Difficulty, however, is experienced installing and maintaining seals about nozzles of these vessels. Vessels frequently have many nozzles and failure of the corrosion liner at a nozzle or the interface between a nozzle and the inner corrosion liner of the vessel often causes failure of the corrosion protection system.

Pipes and fluid conduits have been lined with corrosion resistant film by flaring a projecting end of the pipe liner outwardly to form a sealing gasket against the ring flange of the pipe joint. For this purpose, preheated flaring tools have been used such as are described in U.S. Pat. Nos. 2,907,103 and 3,030,253. A similar flaring techinique is commercially practiced under the designation of RESISTOFLEX by the Resistoflex Corporation, Roseland, N.J.

Heretofore, there has been no effective method for installing liners in nozzles of vessels and for bonding those nozzles to the corrosion lining of the vessel. Instead, the lining of these nozzles has been done on a custom or individualized application, often with erratic and unsatisfactory results.

BRIEF STATEMENT OF THE INVENTION

This invention comprises a protective nozzle liner and a method for installing the nozzle liner in a vessel having one or more nozzles and, in particular, to a method for installing a protective liner in a nozzle of a vessel and for laminating that protective nozzle liner to the inner corrosion liner of the vessel. The nozzle liner is a rotationally molded thermoplastic body which is free of internal stresses and seams. The method is practiced by selecting a preformed nozzle liner having a flange end and a sleeve body with a diameter closely matching the internal diameter of the nozzle, inserting that nozzle liner into the nozzle to seat the end flange against the face of the ring flange on the nozzle. In this position, the opposite end of the nozzle liner projects inwardly of the vessel, terminating adjacent to the inner corrosion liner of the vessel. The opposite end of the nozzle liner is then welded or otherwise bonded to the inner corrosion liner of the vessel. In the preferred installation method, the opposite end of the nozzle liner is received in the vessel, projecting past the inner corrosion liner of the vessel, and this projecting end is heated to a thermoforming temperature. The nozzle liner is then axially compressed using a special compression and flaring tool, whereby this end is flared outwardly into an annular laminating surrounding the nozzle. The width of this laminating region is determined by the length of the projecting end of the nozzle. The laminating region of the nozzle liner is thermally welded to the inner corrosion liner of the vessel. All of the internal stresses generated during the installation and flaring step are localized in the laminating, annular region which overlies the inner corrosion liner of the vessel, thus ensuring that any stressed areas of the nozzle liner are confined to areas in which the vessel is protected with another layer of corrosion resistant material.

BRIEF DESCRIPTION OF THE DRAWINGS

The invention will be described with reference to the FIGURES, of which.

DESCRIPTION OF THE PREFERRED EMBODIMENT

Figure 1:
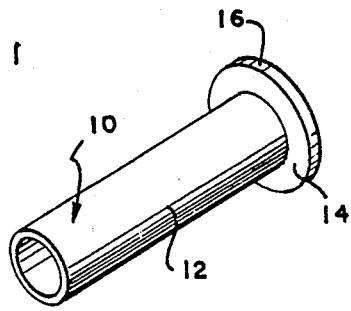
FIG. 1 illustrates a nozzle liner of the invention.

Referring now to FIG. 1, the nozzle liner 10 is illustrated as having a generally cylindrical sleeve 12 with an integral, distally dependent annular flange 14. The liner has a thickness 16 from about 0.05 to about 0.375, preferably from about 0.090 to about 0.110, inch, and the outer diameter of the sleeve portion 12 is selected to closely approximate the internal diameter of the nozzle, permitting insertion of the sleeve 12 into the nozzle. The nozzle liner 10 is preferably a rotormolded body, i.e., is manufactured by rotational molding techniques in which the powdered resins are placed in a rotational molding cavity and molded into conformity with the rotational molding die.

Conventional rotational molding techniques are used to form the nozzle liner. In these techniques, powders of the molding resin, typically passing a 30 mesh screen, are charged to a mold cavity. Usually the mold cavity is a split cavity with two halves which are closed after the resin powder is charged. The closed mold is then heated while tumbling the resin powder by rotating the mold with a rotating arm assembly which rotates the mold about two major axes. The mold is usually heated in an oven which is maintained at a temperature from about 400° to about 700° F. and the mold is rotated slowly, at speeds from 5 to about 15 revolutions per minute until the mold is heated sufficiently to fuse the resin powders into a lining which conforms with the internal walls of the mold cavity. The mold is removed from the oven, cooled to solidify the resin and opened and the finished nozzle liner is ejected from the mold. In most applications, the mold cycle time is from 30 seconds to 10 minutes, depending on the resin, degree of preheating of the mold and the size of the finished nozzle liner.

The nozzle liner is formed of any suitable thermoplastic material commonly used for inner corrosion liners of vessels, e.g., polyvinyl chloride, polypropylene, polyvinyldifluoride, low and high density polyethylene, polyvinylidene fluoride, ethylchlorotetrafluoroethylene, fluorinated ethylene propylene copolymer, perfluoroalkoxy, etc. Many of these polymers are available under trade designations such as KYNAR, SOLEF, TEFLON, HAYLAR, TEFZEL, SARAN, ECTFE, PVDF, FEP, and PFA. Any of the aforementioned thermoplastics can be used and, as previously mentioned, the nozzle liner is formed of molding resin powders of the desired resin.

Figure 2:
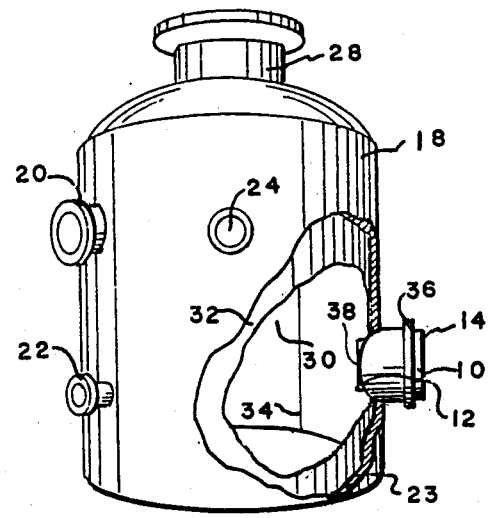
FIG. 2 illustrates a vessel in which the nozzle liner of FIG. 1 is installed.

FIG. 2 illustrates a vessel 18 having at least one and frequently many nozzles such as nozzles 20, 22, 24 and 26. These nozzles can be in the side wall 23 of the vessel or can be in the end walls of the vessel such as nozzle 28. The vessel 18 can be a metallic shell formed of steel or other ferrous alloys or can be of plastics such as the conventional fiber reinforced plastics (FRP) typically used for this purpose. For this purpose, fiberglass reinforced polyester resin vessels are commonly used, however, fiberglas reinforced vessels of other plastics such as epoxy resins and polystyrene resins are also employed. The FRP vessels can have continuous filament windings in longitudinal, radial and/or helical windings, all as in the conventional manufacture.

The vessel can be intended for use as pressure vessel (internal pressure in excess of one atmosphere pressure) or can be an atmospheric pressure vessel. The vessel is lined with a protective inner corrosion liner formed of one or more sheets 30 and 32 of a corrosion resistant resin such as a sheet of any of the aforementioned thermoplastic resins. The protective sheets are applied to the vessel and bonded thereto using suitable adhesives and/or thermal bonding to the side walls of the vessel. The protective sheets are overlaid to form a continuous seam such as 34 and this seam is laminated by thermal or ultrasonic welding of the plastic.

The protective liner 30 is provided with apertures at various nozzle locations. Preferably, each aperture is cut in the thermoplastic sheet liner 30 with the same diameter as the internal diameter of the nozzle. A nozzle liner 10 is selected from a plurality of preformed and thermoformed nozzle liners such as illustrated in FIG. 1. The nozzle liner is selected with a sleeve 12 having a diameter closely approximating the internal diameter of the nozzle such as 26, and the nozzle liner 10 is slid into the nozzle with its flange 14 seated against the ring flange 36 of the nozzle. In this position, the sleeve 12 projects inwardly of the vessel to provide end projection 38.

Figure 3:
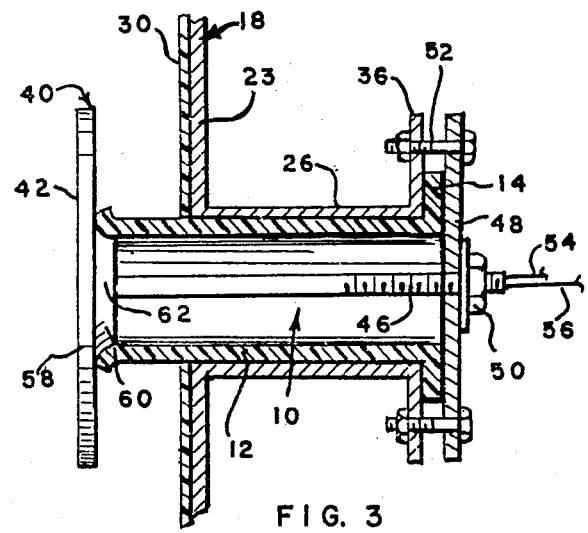
FIG. 3 is an elevational sectional view illustrating the installation of a nozzle liner.

The inwardly projecting end can terminate flush with the inside wall of the vessel 18 and can be bonded or thermally welded in a continuous seam to the inner corrosion liner of the vessel. Preferably, the end projection 38 extends inwardly of the vessel wall a substantial distance, from about 0.25 to about 2.0, and most preferably, from about 0.5 to about 1.5, times the diameter of the nozzle liner, as shown in FIGS. 2 and 3.

The nozzle liner can be thermoformed into its final shape. For this purpose, end flaring and laminating tool 40 is employed. This tool has a flaring plate 42 distally carried by rod 44. Rod 44 is threaded at 46 and receives an abutment plate 48 with a compression nut 50. The abutment plate is placed against the outside face of flange 14 of the nozzle liner 10 and is secured to the ring flange 36 of nozzle 26 using suitable fasteners such as machine bolts 52.

The end projection 38 of the sleeve 12 of the nozzle liner 10 is heated to thermoforming temperatures from about 200° to 350° C., to render the material sufficiently plastic for its thermal deformation and bonding to the liner 30 of the vessel 18. This can be accomplished by various means such as a hot air gun, however, preferably, the flaring heat 42 is electrically heated to a sufficiently high temperature and is maintained at that temperature for this application. To this end, the flaring head 42 can have internal heaters such as resistance wire heater or Cal rod and can be provided with electrical power through conductors 54 and 56 which extend internally through rod 44. The resistance heater is preferably located in the forward face of the flaring head 42.

The flaring head 42 is formed with a larger diameter plate 58 and a forward face having a raised boss 60 and an arcuate, preferably quarter round, concave side wall 62. When the projecting end 38 of the plastic nozzle liner 10 is heated to a plastic deformation temperature, the installer advances compression nut 50 on rod 44 which axially compresses the nozzle 10, flaring the projecting end 38 outwardly. The contined advancement of the compression nut 50 on rod 44 retracts the flaring tool towards the inside wall of the vessel and flares the projecting end outwardly and into an annular laminating ring area 62 wich is then bonded into a secure lamination with the inner corrosion liner 30 of the vessel.

Figure 4:
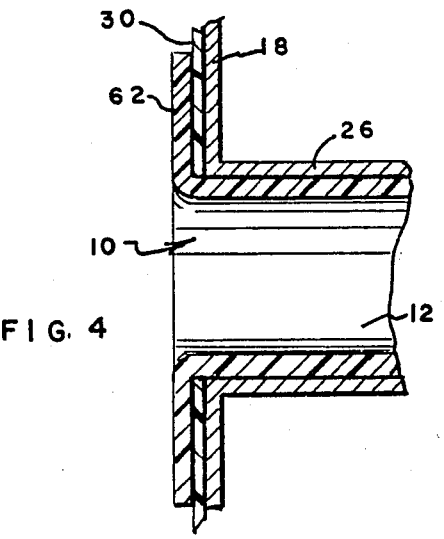
FIG. 4 is an elevational sectional view illustrating the annular laminated area surrounding the nozzle installed in accordance with the invention.

FIG. 4 illustrates the finished installation. As there illustrated, the nozzle liner 10 is securely in place with the outwardly flared annular ring area 62 welded to the inner corrosion liner 30 of the vessel 18. This installation isolates all internally stressed portions of the nozzle liner 10 in the ring area 62 which overlies the inner corrosion liner 30 of the vessel 18. Thus, the vessel is provided with a double laminated area of protection in the only region in which internal stresses can be introduced in the nozzle liner. In the remainder of the nozzle liner such as the sleeve body 12 and its opposite end flange 14, the plastic is free of internal stresses because of its rotational molding manufacture and because the method of its installation does not generate any internal stresses in other portions of the nozzle liner 10.

Figure 5:
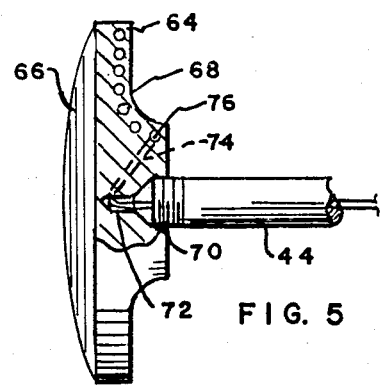
FIG. 5 illustrates a flaring head with an arcuate face.

In the illustrated embodiment, the flaring head 42 is shown as a flat circular plate. In instances in which liners are installed in cylindrical vessels of relatively minor internal diameters, this flaring head 42 can, of course, be formed with an arcuate face such as illustrated in FIG. 5. As shown in FIG. 5, the flaring head 64 has an arcuate contour with its rear face 66 being arcuately concave and with an arcuate forward face 68. The flaring head 64 can have a central threaded bore 70 to receive the end of rod 44 and has a small diameter counter bore 72 which communicates with a bore 74 that communicates with a plurality of annular resistance heating elements 76.

The invention has been described with reference to the illustrated and presently preferred embodiment thereof. It is not intended that the invention be unduly limited by this illustration of the preferred embodiment. Instead, the invention is to be defined by the means and by the steps, and their obvious equivalents, set forth in the following claims.

What is claimed is:

1. The combination of a nozzle liner free of internal stresses and seams and a vessel having an internal corrosion liner and a nozzle extending externally of the vessel with a distal ring flange, with said nozzle liner received in said nozzle and having:
    (a) a sleeve body having an outer diameter substantially equal to the inside diameter of said nozzle and a length greater than the length of said nozzle to provide an inward end which projects inwardly beyond the inside wall of said vessel and which is bonded to said corrosion liner of said vessel; and
    (b) an integral end flange on the outer end of said liner and abutted against the ring flange of said nozzle;

said nozzle liner being formed by rotational molding a powdered thermoplastic resin to form said nozzle liner with said integral ring flange free of internal stresses and seams.

2. The combination of claim 1 formed of rotationally molded polytetrafluoroethylene.

3. The combination of claim 1 wherein said integral end flange has a diameter substantially equal to the diameter of said ring flange on said nozzle.

4. The combination of claim 1 having a length which exceeds the length of said nozzle by a distance from 0.5 to about 2.0 times its diameter.

5. The combination of claim 1 wherein said nozzle liner has a wall thickness from about 0.050 to about 0.375 inch.

6. The combination of claim 1 wherein said opposite end of said nozzle liner is a thermoformed annulus about the inner end of said nozzle which overlies the inner corrosion liner of said vessel to form a laminating region in which said thermoformed annular is bonded to the underlying inner corrosion liner.

7. A method for installing a protective liner in a vessel having at least one ring-flanged nozzle wherein the vessel is internally lined with an inner corrosion liner, the improvement comprising:
 (a) rotationally molding a thermoplastic resin into a nozzle liner with a sleeve having an outer diameter substantially equal to the internal diameter of said nozzle, a length at least equal to the length of said nozzle, and an integral end flange, thereby forming said nozzle liner without internal stresses and without seams;
 (b) inserting said nozzle liner into said nozzle to seat its internal end against the outer face of the ring flange of said nozzle and to project its opposite end into adjacent proximity of the inner corrosion liner of said vessel which surrounds said the inner end of said nozzle;
 (c) bonding said opposite end of said nozzle liner to the inner corrosion liner of said vessel in a continuous bond.

8. The method of claim 7 wherein said opposite end of said nozzle liner to projected past the inside wall of said vessel to provide an end projection of a predetermined length inside said vessel.

9. The method of claim 7 including the steps of heating said end projection of said nozzle liner within said vessel to a thermoplastic condition and applying an axial force to said nozzle liner to axially compress said liner and flare said end projection radially outwardly into an annular ring.

10. The method of claim 9 wherein the length of said end projection is from 0.25 to about 2.0 times the diameter of said nozzle liner and said annular ring is thereby formed with a diameter from 1.5 to about 5 times the diameter of said nozzle liner.

11. The method of claim 10 including the additional step of compressing said annular ring against the inside wall of said vessel to laminate and bond said annular ring against the inner corrosion lining of said vessel.

12. The method of claim 10 including the step of heating said annular ring and the underlying portion of said inner corrosion lining while compressing said annular ring.

13. A method for installing a protective liner in a vessel having at least one ring-flanged nozzle wherein the vessel is internal lined with an inner corrosion liner, the improvement comprising:
 (a) rotationally molding a thermoplastic resin into a nozzle liner with a sleeve having an outer diameter substantially equal to the internal diameter of said nozzle, a length exceeding the length of said nozzle by an amount from 0.25 to about 2.0 times its diameter, and an integral end flange, thereby forming said nozzle liner without internal stresses and without seams;
 (b) inserting said nozzle liner into said nozzle to seat its integral end against the outer face of the ring flange of said nozzle and to project its opposite end beyond the inner corrosion liner of said vessel by the aforesaid amount;
 (c) heating said end projection of said nozzle liner within said vessel to a thermoplastic condition; and
 (d) applying an axial force to said nozzle liner to axially compress said liner and flare said end projection radially outwardly into an annular ring having a diameter from 1.5 to about 5.0 times the diameter of said nozzle liner.

14. The method of claim 13 wherein the length of said end projection is from 0.5 to about 1.0 times the diameter of said nozzle liner and said annular ring is thereby formed with a diameter from 2 to about 3 times the diameter of said nozzle liner.

15. The method of claim 13 including the step of heating said annular ring and the underlying portion of said inner corrosion lining while compressing said annular ring.

* * * * *